United States Patent
Kim et al.

(10) Patent No.: US 11,564,277 B2
(45) Date of Patent: Jan. 24, 2023

(54) METHOD AND APPARATUS FOR SUPPORTING EARLY DATA TRANSMISSION IN INACTIVE STATE IN WIRELESS COMMUNICATION SYSTEM

(71) Applicant: LG ELECTRONICS INC., Seoul (KR)

(72) Inventors: Seokjung Kim, Seoul (KR); Daewook Byun, Seoul (KR); Jian Xu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 38 days.

(21) Appl. No.: 17/256,992

(22) PCT Filed: Aug. 16, 2019

(86) PCT No.: PCT/KR2019/010425
§ 371 (c)(1),
(2) Date: Dec. 29, 2020

(87) PCT Pub. No.: WO2020/036460
PCT Pub. Date: Feb. 20, 2020

(65) Prior Publication Data
US 2021/0160949 A1 May 27, 2021

(30) Foreign Application Priority Data
Aug. 16, 2018 (KR) .................. 10-2018-0095217

(51) Int. Cl.
*H04W 76/19* (2018.01)
*H04W 76/11* (2018.01)
*H04W 76/27* (2018.01)

(52) U.S. Cl.
CPC ............ *H04W 76/19* (2018.02); *H04W 76/11* (2018.02); *H04W 76/27* (2018.02)

(58) Field of Classification Search
CPC . H04W 24/10; H04W 28/20; H04W 72/1268; H04W 72/1284; H04W 72/14;
(Continued)

(56) References Cited

U.S. PATENT DOCUMENTS

| | | | |
|---|---|---|---|
| 9,232,404 B2 * | 1/2016 | Chen | H04W 12/10 |
| 2011/0205900 A1 * | 8/2011 | Zhang | H04L 47/10 370/254 |

(Continued)

FOREIGN PATENT DOCUMENTS

KR 1020180035719 4/2018

OTHER PUBLICATIONS

PCT International Application No. PCT/KR2019/010425, International Search Report dated Nov. 25, 2019, 3 pages.
(Continued)

*Primary Examiner* — Jean A Gelin
(74) *Attorney, Agent, or Firm* — Lee Hong Degerman Kang Waimey

(57) ABSTRACT

A method and apparatus for supporting an early data transmission (EDT) in a radio resource control (RRC) inactive state is provided. The current gNB receives a resume request message including uplink (UL) data from the wireless device, and transmits a logical channel identifier (LCID) for the UL data to the last serving gNB. The last serving gNB transmits UL forwarding user plane (UP) transport network layer (TNL) information to the current gNB based on mapping between the LCID for the UL data and data radio bearer (DRB) ID or protocol data unit (PDU) session ID in a UE context stored in the last serving gNB. The current gNB forwards the UL data to a core network via the last serving gNB based on the UL forwarding UP TNL information.

10 Claims, 18 Drawing Sheets

(58) Field of Classification Search
CPC ........... H04W 74/0833; H04W 76/046; H04W 76/10; H04W 76/11; H04W 76/19; H04W 76/27

See application file for complete search history.

(56) References Cited

U.S. PATENT DOCUMENTS

| | | | | |
|---|---|---|---|---|
| 2012/0275381 | A1* | 11/2012 | Kim | H04W 74/08 370/328 |
| 2014/0321282 | A1* | 10/2014 | Pragada | H04W 28/10 370/235 |
| 2016/0119762 | A1* | 4/2016 | Zhu | H04W 28/0268 370/312 |
| 2017/0331670 | A1* | 11/2017 | Parkvall | H04W 24/10 |
| 2018/0176834 | A1 | 6/2018 | Wei et al. | |
| 2018/0368194 | A1* | 12/2018 | Tang | H04W 72/0406 |
| 2019/0215726 | A1* | 7/2019 | Park | H04L 1/08 |
| 2019/0238345 | A1* | 8/2019 | Gage | H04L 9/0833 |
| 2019/0350002 | A1* | 11/2019 | Chen | H04W 72/14 |
| 2019/0380128 | A1* | 12/2019 | Park | H04W 72/0433 |
| 2019/0394824 | A1* | 12/2019 | Turtinen | H04W 76/19 |
| 2020/0029239 | A1* | 1/2020 | Chen | H04W 76/15 |
| 2020/0037345 | A1* | 1/2020 | Ryoo | H04W 76/27 |
| 2020/0053791 | A1* | 2/2020 | Ozturk | H04W 76/27 |
| 2020/0077329 | A1* | 3/2020 | Zhu | H04W 76/20 |
| 2020/0214070 | A1* | 7/2020 | Ingale | H04W 74/0833 |
| 2021/0084539 | A1* | 3/2021 | Centonza | H04W 28/06 |
| 2021/0168570 | A1* | 6/2021 | Navratil | H04W 72/005 |
| 2021/0176670 | A1* | 6/2021 | Keskitalo | H04W 24/08 |
| 2021/0352547 | A1* | 11/2021 | Chang | H04W 36/0079 |
| 2022/0124619 | A1* | 4/2022 | Sun | H04W 52/0216 |

OTHER PUBLICATIONS

Samsung, "Discussions on Inactive to Connected RRC transition within high-layer split", 3GPP TSG RAN WG3 Meeting #97bis, R3-173848, Oct. 2017, 7 pages.

Chen Jie et al., "ZTE Communications," An International ICT R&D Journal Sponsored by ZTE Corporation, vol. 16, No. 2, pp. 1-66, Jun. 2018, 73 pages.

3rd Generation Partnership Project (3GPP), "Technical Specification Group Radio Access Network; NR; NR and NG-RAN Overall Description; Stage 2 (Release 15)," 3GPP TS 38.300 V15.2 0, Jun. 2018, 88 pages.

3rd Generation Partnership Project (3GPP), "Technical Specification Group Radio Access Network; NG-RAN Architecture description (Release 15)," Section 6 of 3GPP TS 38 401 V15.2 0, Jun. 2018, 39 pages.

3rd Generation Partnership Project (3GPP), "Technical Specification Group Radio Access Network; NG-RAN; F1 general aspects and principles (Release 15)," Sections 5.2 and 7.1 of 3GPP TS 38.470 V15.1.0, Mar. 2018, 11 gages.

* cited by examiner

METHOD AND APPARATUS FOR SUPPORTING EARLY DATA TRANSMISSION IN INACTIVE STATE IN WIRELESS COMMUNICATION SYSTEM

CROSS-REFERENCE TO RELATED APPLICATIONS

This application is the National Stage filing under 35 U.S.C. 371 of International Application No. PCT/KR2019/010425, filed on Aug. 16, 2019, which claims the benefit of earlier filing date and right of priority to Korean Patent Application No. 10-2018-0095217, filed on Aug. 16, 2018, the contents of which are all incorporated by reference herein in their entirety.

TECHNICAL FIELD

The present invention relates to wireless communication and, more particularly, to a method and apparatus for supporting an early data transmission in a radio resource control (RRC) inactive state, which includes enhanced RRC connection resume procedure for a wireless device in the RRC inactive state considering the fast data forwarding.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Radio resource control (RRC) inactive state is a new state added in 5G NR compare to LTE. Motivation to use this state seems to reduce the time to bring user equipment (UE) in connected state from other states. This will increase UE battery life and latency as well because of less signaling involved. Both UE and gNB stores access stratum (AS) context in RRC inactive state and bringing to RRC connected state from RRC inactive state would not involve NAS level signaling.

SUMMARY

Connection, both for control plane (CP) and user plane (UP), between radio access network (RAN) and core network should be maintained in the RRC inactive state. However, it may be needed to deliver uplink (UL) data from the current gNB to the last serving gNB without fetching UE context when the UE is still in the RRC inactive state. In other words, a method for transmitting UL data, of which size is relatively small, to the last serving gNB may be needed, while the UE does not transit to the RRC connected state in order to the UL data.

In an aspect, a method performed by a current gNB in a wireless communication system is provided. The method includes receiving a resume request message including uplink (UL) data from a wireless device, transmitting a logical channel identifier (LCID) for the UL data to a last serving gNB, receiving UL forwarding user plane (UP) transport network layer (TNL) information from the last serving gNB, and forwarding the UL data to a core network via the last serving gNB based on the UL forwarding UP TNL information.

In another aspect, a method performed by a last serving gNB in a wireless communication system is provided. The method includes receiving a logical channel identifier (LCID) for uplink (UL) data from a current gNB, transmitting UL forwarding user plane (UP) transport network layer (TNL) information to the current gNB based on mapping between the LCID for the UL data and data radio bearer (DRB) ID or protocol data unit (PDU) session ID in a UE context stored in the last serving gNB, receiving the UL data from the current gNB based on the UL forwarding UP TNL information, and forwarding the UL data to a core network, The current gNB is a gNB on which the wireless device is currently camped in an inactive state, and the last serving gNB is a gNB on which the wireless device was connected lastly before transiting to the inactive state.

Small UL data can be delivered to the core network quickly, without state transition of UE from the RRC inactive state to the RRC connected state and without fetching UE context from the last serving gNB.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 1:
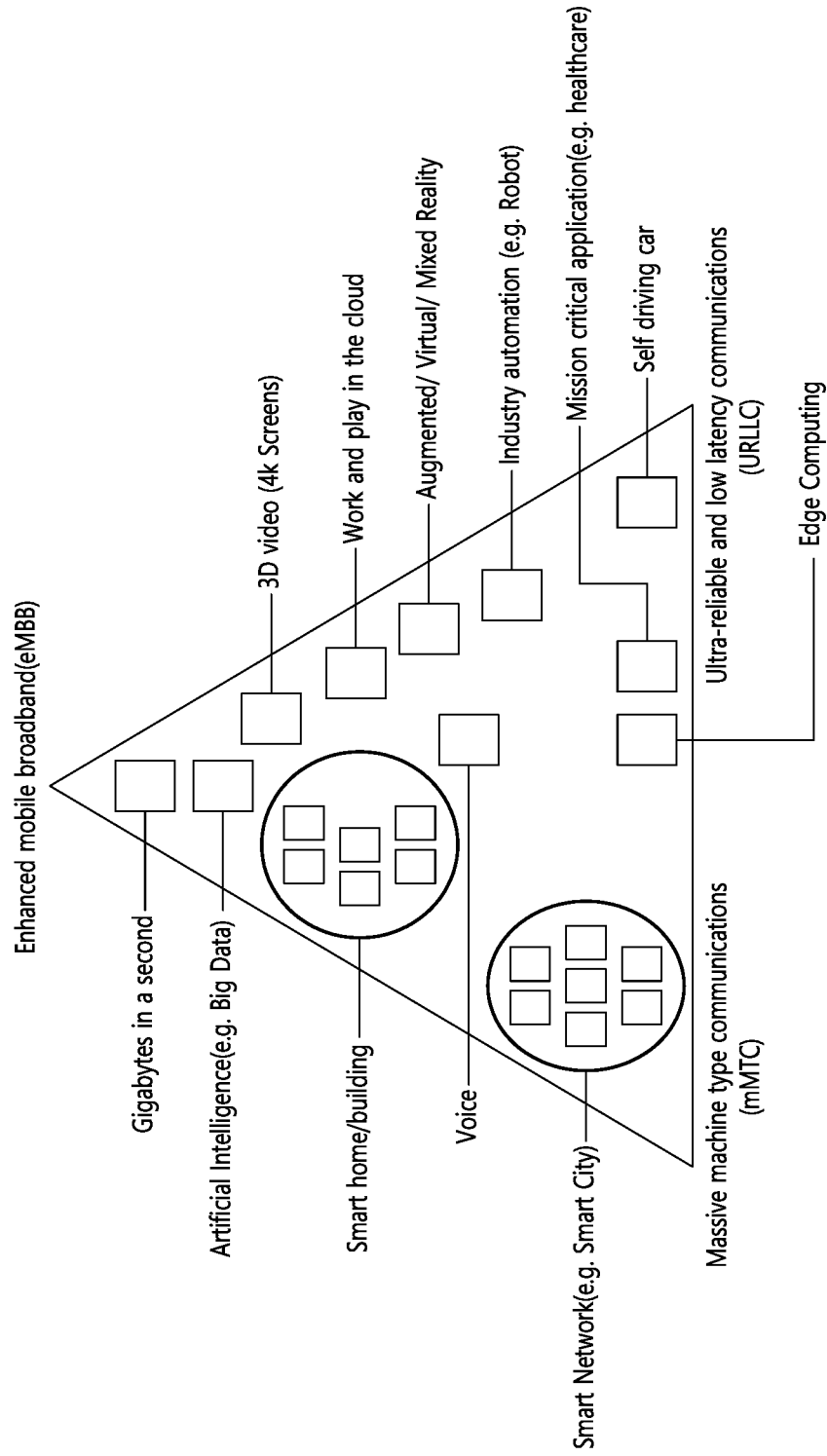
FIG. 1 shows examples of 5G usage scenarios to which the technical features of the present invention can be applied.

FIG. 1 shows examples of 5G usage scenarios to which the technical features of the present invention can be applied.

The 5G usage scenarios shown in FIG. 1 are only exemplary, and the technical features of the present invention can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
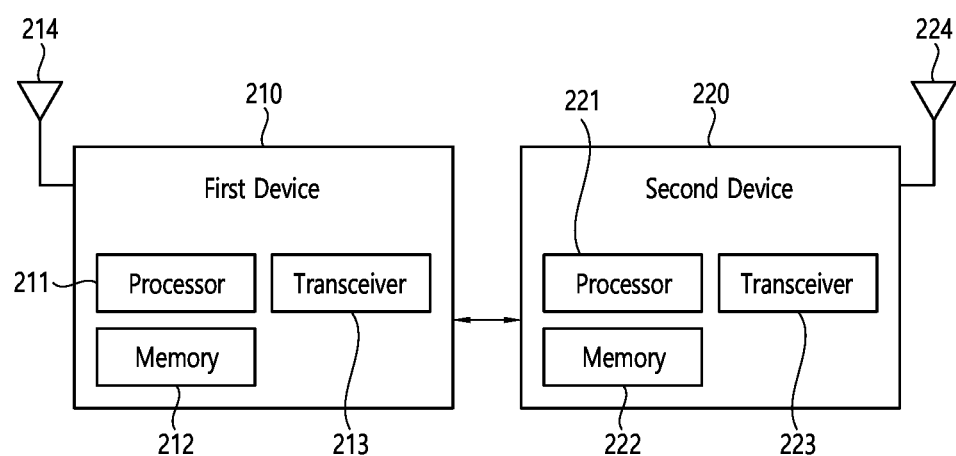
FIG. 2 shows an example of a wireless communication system to which the technical features of the present invention can be applied.

FIG. 2 shows an example of a wireless communication system to which the technical features of the present invention can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present invention described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present invention described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
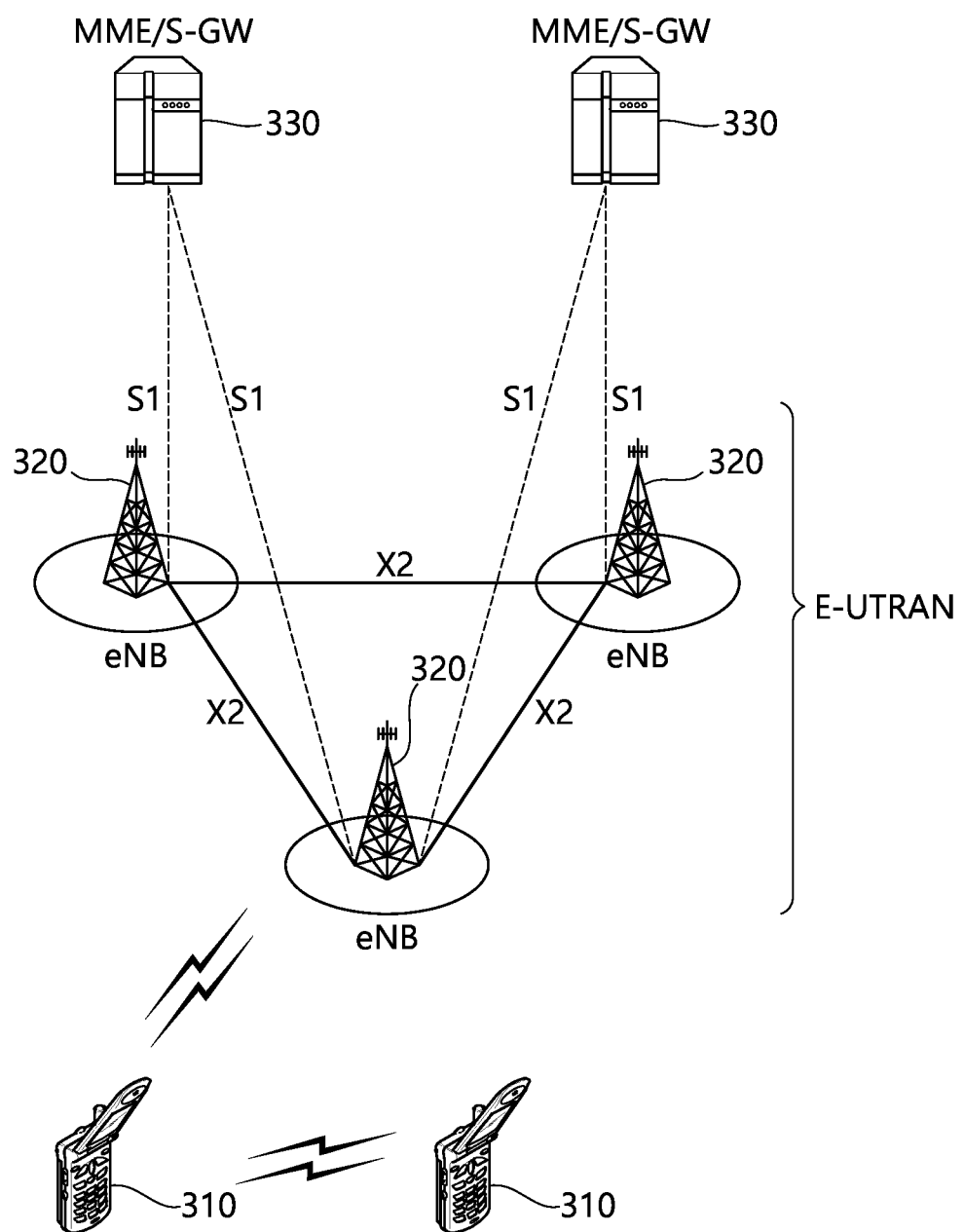
FIG. 3 shows an example of a wireless communication system to which the technical features of the present invention can be applied.

FIG. 3 shows an example of a wireless communication system to which the technical features of the present invention can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
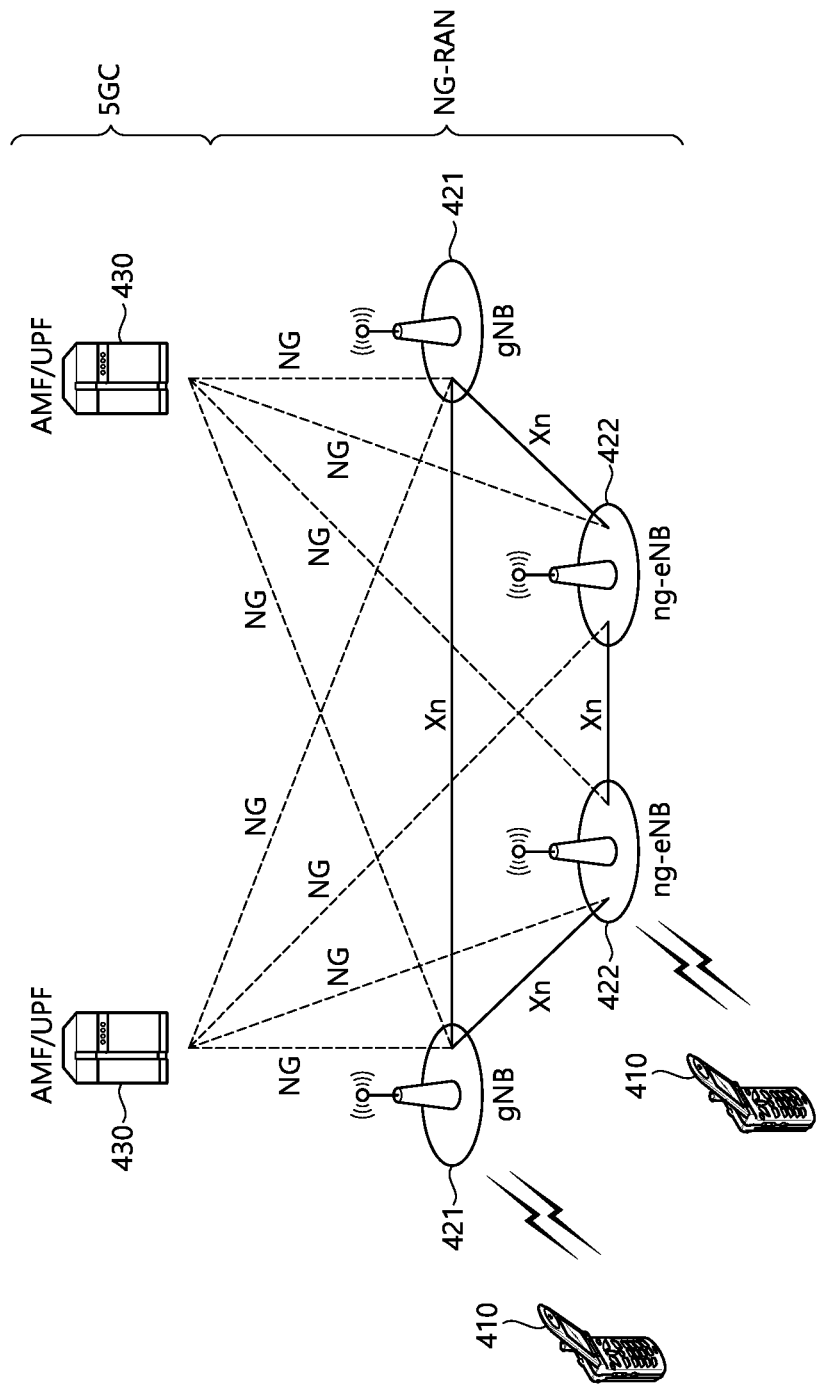
FIG. 4 shows another example of a wireless communication system to which the technical features of the present invention can be applied.

FIG. 4 shows another example of a wireless communication system to which the technical features of the present invention can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW).

The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
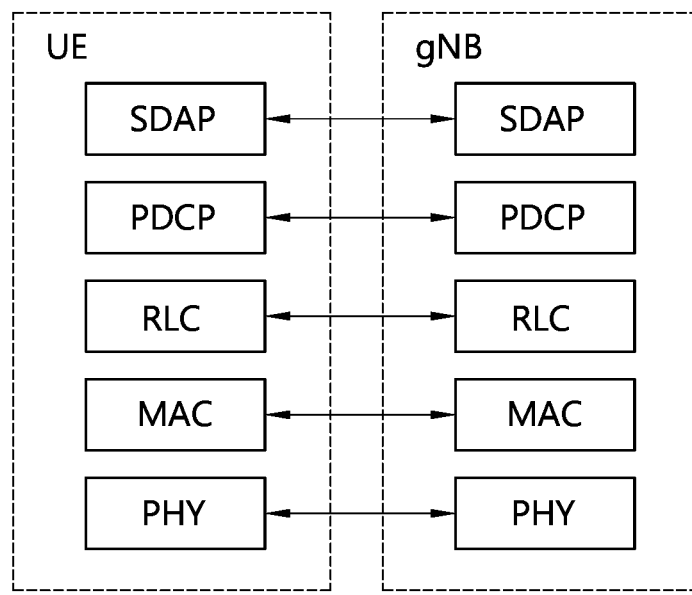
FIG. 5 shows a block diagram of a user plane protocol stack to which the technical features of the present invention can be applied.
Figure 6:
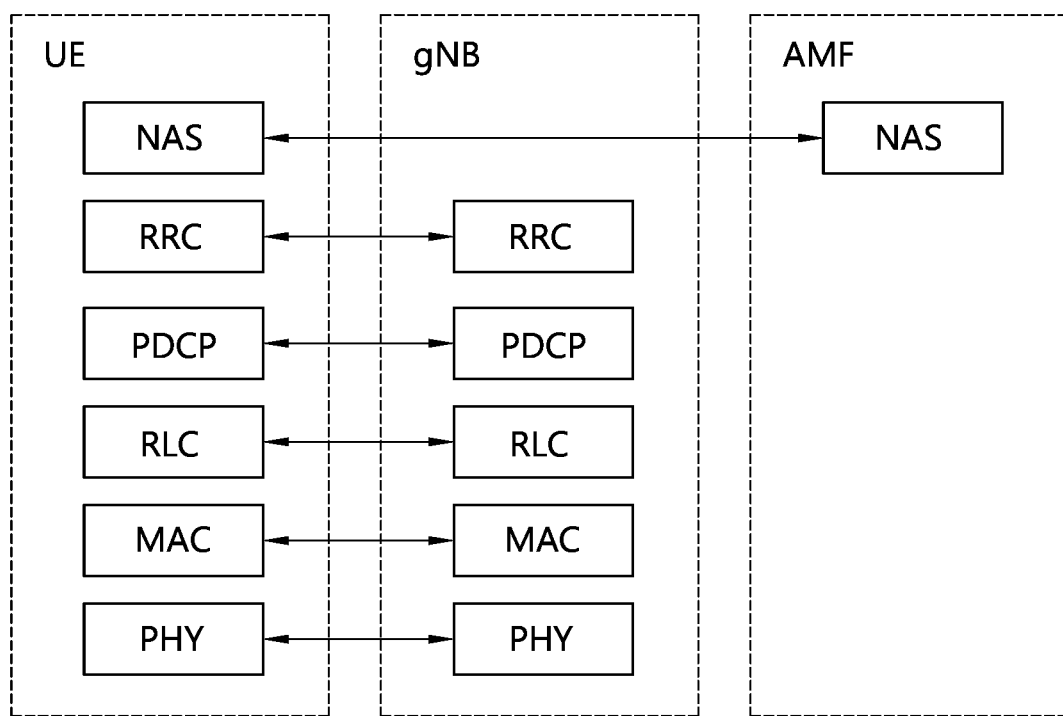
FIG. 6 shows a block diagram of a control plane protocol stack to which the technical features of the present invention can be applied.

FIG. 5 shows a block diagram of a user plane protocol stack to which the technical features of the present invention can be applied. FIG. 6 shows a block diagram of a control plane protocol stack to which the technical features of the present invention can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

Split of gNB central unit (gNB-CU) and gNB distributed unit (gNB-DU) is described. Section 6 of 3GPP TS 38.401 V15.2.0 (2018-06) and Sections 5.2 and 7.1 of 3GPP TS 38.470 V15.1.0 (2018-03) may be referred.

Figure 7:
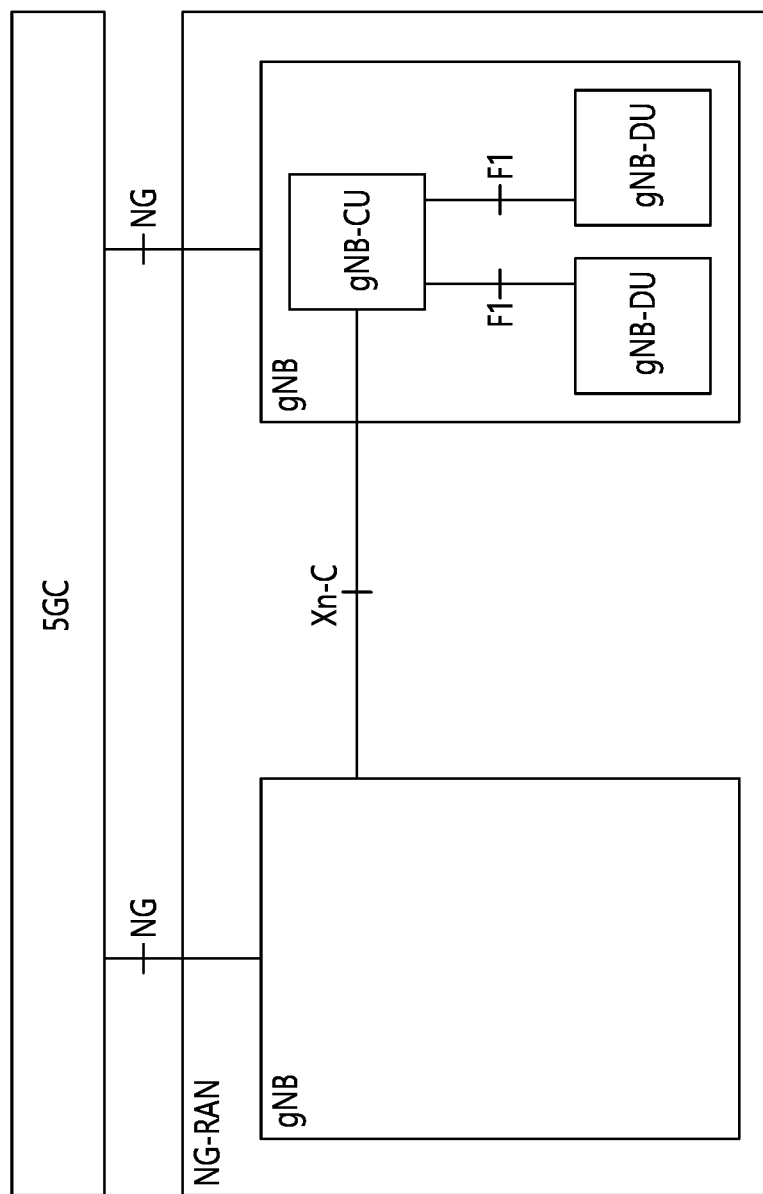
FIG. 7 shows an example of the overall architecture of an NG-RAN to which technical features of the present invention can be applied.

FIG. 7 shows an example of the overall architecture of an NG-RAN to which technical features of the present invention can be applied.

Referring to FIG. 7, a gNB may include a gNB-CU (hereinafter, gNB-CU may be simply referred to as CU) and at least one gNB-DU (hereinafter, gNB-DU may be simply referred to as DU).

The gNB-CU is a logical node hosting RRC, SDAP and PDCP protocols of the gNB or an RRC and PDCP protocols of the en-gNB. The gNB-CU controls the operation of the at least one gNB-DU.

The gNB-DU is a logical node hosting RLC, MAC, and physical layers of the gNB or the en-gNB. The operation of the gNB-DU is partly controlled by the gNB-CU. One gNB-DU supports one or multiple cells. One cell is supported by only one gNB-DU.

The gNB-CU and gNB-DU are connected via an F1 interface. The gNB-CU terminates the F1 interface connected to the gNB-DU. The gNB-DU terminates the F1 interface connected to the gNB-CU. One gNB-DU is connected to only one gNB-CU. However, the gNB-DU may be connected to multiple gNB-CUs by appropriate implementation. The F1 interface is a logical interface. For NG-RAN, the NG and Xn-C interfaces for a gNB consisting of a gNB-CU and gNB-DUs, terminate in the gNB-CU. For E-UTRAN-NR dual connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

Functions of the F1 interface includes F1 control (F1-C) functions as follows.

(1) F1 Interface Management Function

The error indication function is used by the gNB-DU or gNB-CU to indicate to the gNB-CU or gNB-DU that an error has occurred.

The reset function is used to initialize the peer entity after node setup and after a failure event occurred. This procedure can be used by both the gNB-DU and the gNB-CU.

The F1 setup function allows to exchange application level data needed for the gNB-DU and gNB-CU to interoperate correctly on the F1 interface. The F1 setup is initiated by the gNB-DU.

The gNB-CU configuration update and gNB-DU configuration update functions allow to update application level configuration data needed between gNB-CU and gNB-DU to interoperate correctly over the F1 interface, and may activate or deactivate cells.

The F1 setup and gNB-DU configuration update functions allow to inform the single network slice selection assistance information (S-NSSAI) supported by the gNB-DU.

The F1 resource coordination function is used to transfer information about frequency resource sharing between gNB-CU and gNB-DU.

(2) System Information Management Function

Scheduling of system broadcast information is carried out in the gNB-DU. The gNB-DU is responsible for transmitting the system information according to the scheduling parameters available.

The gNB-DU is responsible for the encoding of NR master information block (MIB). In case broadcast of system information block type-1 (SIB1) and other SI messages is needed, the gNB-DU is responsible for the encoding of SIB1 and the gNB-CU is responsible for the encoding of other SI messages.

(3) F1 UE Context Management Function

The F1 UE context management function supports the establishment and modification of the necessary overall UE context.

The establishment of the F1 UE context is initiated by the gNB-CU and accepted or rejected by the gNB-DU based on admission control criteria (e.g., resource not available).

The modification of the F1 UE context can be initiated by either gNB-CU or gNB-DU. The receiving node can accept or reject the modification. The F1 UE context management function also supports the release of the context previously established in the gNB-DU. The release of the context is triggered by the gNB-CU either directly or following a request received from the gNB-DU. The gNB-CU request the gNB-DU to release the UE Context when the UE enters RRC_IDLE or RRC_INACTIVE.

This function can be also used to manage DRBs and SRBs, i.e., establishing, modifying and releasing DRB and SRB resources. The establishment and modification of DRB resources are triggered by the gNB-CU and accepted/rejected by the gNB-DU based on resource reservation information and QoS information to be provided to the gNB-DU. For each DRB to be setup or modified, the S-NSSAI may be provided by gNB-CU to the gNB-DU in the UE context setup procedure and the UE context modification procedure.

The mapping between QoS flows and radio bearers is performed by gNB-CU and the granularity of bearer related management over F1 is radio bearer level. For NG-RAN, the gNB-CU provides an aggregated DRB QoS profile and QoS flow profile to the gNB-DU, and the gNB-DU either accepts the request or rejects it with appropriate cause value. To support packet duplication for intra-gNB-DU carrier aggregation (CA), one data radio bearer should be configured with two GPRS tunneling protocol (GTP)-U tunnels between gNB-CU and a gNB-DU.

With this function, gNB-CU requests the gNB-DU to setup or change of the special cell (SpCell) for the UE, and the gNB-DU either accepts or rejects the request with appropriate cause value.

With this function, the gNB-CU requests the setup of the secondary cell(s) (SCell(s)) at the gNB-DU side, and the gNB-DU accepts all, some or none of the SCell(s) and replies to the gNB-CU. The gNB-CU requests the removal of the SCell(s) for the UE.

(4) RRC Message Transfer Function

This function allows to transfer RRC messages between gNB-CU and gNB-DU. RRC messages are transferred over F1-C. The gNB-CU is responsible for the encoding of the dedicated RRC message with assistance information provided by gNB-DU.

(5) Paging Function

The gNB-DU is responsible for transmitting the paging information according to the scheduling parameters provided.

The gNB-CU provides paging information to enable the gNB-DU to calculate the exact paging occasion (PO) and paging frame (PF). The gNB-CU determines the paging assignment (PA). The gNB-DU consolidates all the paging records for a particular PO, PF and PA, and encodes the final RRC message and broadcasts the paging message on the respective PO, PF in the PA.

(6) Warning Messages Information Transfer Function

This function allows to cooperate with the warning message transmission procedures over NG interface. The gNB-CU is responsible for encoding the warning related SI message and sending it together with other warning related information for the gNB-DU to broadcast over the radio interface.

Figure 8:
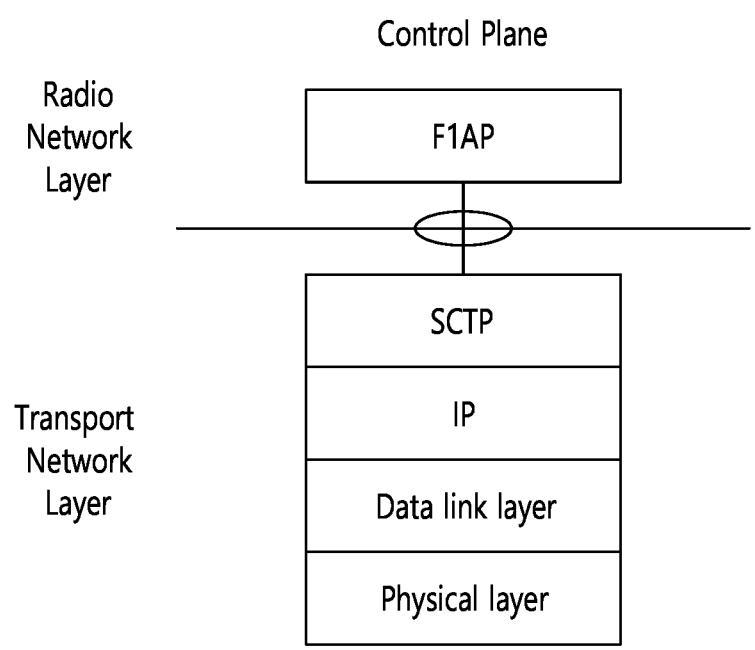
FIG. 8 shows an interface protocol structure for F1-C to which technical features of the present invention can be applied.

FIG. 8 shows an interface protocol structure for F1-C to which technical features of the present invention can be applied.

A transport network layer (TNL) is based on Internet protocol (IP) transport, comprising a stream control transmission protocol (SCTP) layer on top of the IP layer. An application layer signaling protocol is referred to as an F1 application protocol (F1AP).

Mobility in RRC_INACTIVE is described. Section 9.2.2 of 3GPP TS 38.300 V15.2.0 (2018-06) can be referred.

RRC_INACTIVE is a state where a UE remains in CM-CONNECTED and can move within an area configured by NG-RAN (the RAN-based notification area (RNA)) without notifying NG-RAN. In RRC_INACTIVE, the last serving gNB node keeps the UE context and the UE-associated NG connection with the serving AMF and UPF.

If the last serving gNB receives DL data from the UPF or DL signaling from the AMF (except the UE Release Command and Reset messages) while the UE is in RRC_INACTIVE, it pages in the cells corresponding to the RNA and may send XnAP RAN Paging to neighbor gNB(s) if the RNA includes cells of neighbor gNB(s).

If the last serving NG-RAN node receives the UE Release Command message from the AMF while the UE is in RRC_INACTIVE, it shall reply with the UE Context Release Complete message.

The AMF provides to the NG-RAN node the RRC inactive assistant information to assist the NG-RAN node's decision whether the UE can be sent to RRC_INACTIVE. The RRC Inactive assistant information includes the registration area configured for the UE, the UE specific DRX, periodic registration update timer, an indication if the UE is configured with mobile Initiated connection only (MICO) mode by the AMF, and UE identity index value. The UE registration area is taken into account by the NG-RAN node when configuring the RNA. The UE specific DRX and UE identity index value are used by the NG-RAN node for RAN paging. The periodic registration update timer is taken into account by the NG-RAN node to configure periodic RNA update timer.

At transition to RRC_INACTIVE, the NG-RAN node may configure the UE with a periodic RNA update timer value.

If the UE accesses a gNB (i.e. current gNB) other than the last serving gNB, the receiving gNB triggers the XnAP Retrieve UE Context procedure to get the UE context from the last serving gNB and may also trigger a Data Forwarding procedure including tunnel information for potential recovery of data from the last serving gNB. Upon successful UE context retrieval, the receiving gNB shall perform the slice-aware admission control in case of receiving slice information and becomes the serving gNB and it further triggers the NGAP Path Switch Request procedure. After the path switch procedure, the serving gNB triggers release of the UE context at the last serving gNB by means of the XnAP UE Context Release procedure.

In case the UE is not reachable at the last serving gNB, the gNB shall fail AMF initiated UE-associated class 1 procedures if any, and shall trigger the NAS Non Delivery Indication procedure to report the non-delivery of any NAS PDUs received from the AMF for the UE.

If the UE accesses a gNB other than the last serving gNB and the receiving gNB does not find a valid UE Context, gNB performs establishment of a new RRC connection instead of resumption of the previous RRC connection.

A UE in RRC_INACTIVE is required to initiate RNA update procedure when it moves out of the configured RNA. When receiving RNA update request from the UE, the receiving gNB triggers the XnAP Retrieve UE Context procedure to get the UE context from the last serving gNB and may decide to send the UE back to RRC_INACTIVE, move the UE into RRC_CONNECTED, or send the UE to RRC_IDLE.

When the UE enters RRC_INACTIVE, the connection between gNB and NR core network (NGC) is still maintained. However, if the UE wants to transmit the UL data without transiting to RRC_CONNECTED, there is a need to forward the UL data from the current gNB to the last serving gNB without retrieving UE context and without transiting to RRC_CONNECTED. This is because the amount of the UL data to be sent in RRC_INACTIVE may be small. Thus, the UL data should be forwarded to minimize latency for data transmission in RAN. In order to forward the UL data received from the UE to the last serving gNB, a new procedure to allocate forwarding address between the current gNB and last serving gNB may need to be defined.

Since the last serving gNB stores the UE context, the last serving gNB can be aware of mapping relationship between logical channel ID (LCID) which carries the UL data and DRB ID (or PDU session ID). Therefore, when requesting the UE context to the last serving gNB, the current gNB needs to provide to the last serving gNB LCID for early data transmission (EDT), in order to indicate arrival of the UL small data based on EDT procedure and request of TNL information for data forwarding to the last serving gNB. Based on the LCID for EDT, the last serving gNB should inform the current gNB of the TNL information for the UL data. Accordingly, a new procedure to request TNL information for data forwarding and acknowledge this information between the current gNB and the last serving gNB may need to be defined.

EDT means data transmission while in RRC_IDLE and/or RRC_INACTIVE without transiting to RRC_CONNECTED by using a random access procedure, e.g. MSG3 (RRC setup request message and/or RRC resume request message) of the random access procedure.

Furthermore, if CU-DU split is considered, a method for forwarding UL data to the core network via the last serving gNB for F1 interface without transiting to RRC_CONNECTED may also need to be defined.

Hereinafter, in order to quickly transmit the UL small data without transiting from RRC_INACTIVE to RRC_CONNECTED depending on efficient allocation of TNL information for data forwarding, various embodiments of the present invention for supporting EDT in RRC_INACTIVE are described.

In the description below, a UE is merely an example of a wireless device. The present invention is not limited thereto. The wireless device may include a UE, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

1. Embodiment 1

According to the embodiment 1 of the present invention, the current gNB, i.e. gNB on which the UE is camped currently, may indicate LCID for EDT to the last serving gNB, i.e. gNB to which the UE is connected lastly before transiting to RRC_INACTIVE. When the last serving gNB is successfully aware of mapping between the LCID for EDT and DRB ID based on stored UE context, the last serving gNB may inform the current gNB of the UL forwarding UP TNL information. For CU-DU split, the gNB-CU and gNB-DU in the current gNB may exchange the LCID and UP TNL information for F1 interface.

Figure 9:
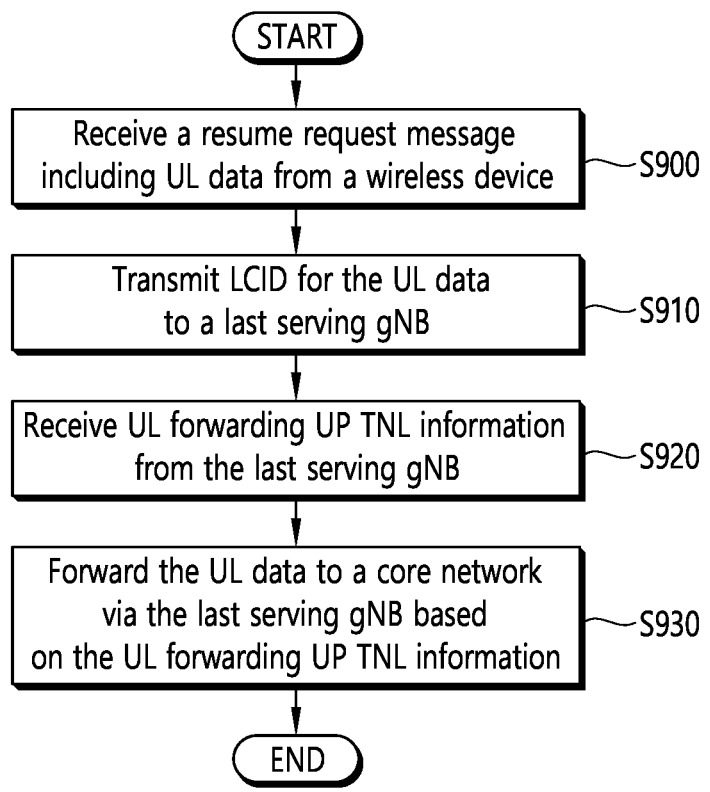
FIG. 9 shows an example of a method for a current gNB supporting EDT in RRC_INACTIVE according to the embodiment 1 of the present invention.

FIG. 9 shows an example of a method for a current gNB supporting EDT in RRC_INACTIVE according to the embodiment 1 of the present invention.

A current gNB is a gNB on which a UE is currently camped in RRC_INACTIVE, and a last serving gNB is a gNB on which the UE was connected lastly before transiting to RRC_INACTIVE.

In step S900, the current gNB receives a resume request message including UL data from the UE. The UE may be in RRC_INACTIVE. The resume request message may be multiplexed with a DRB PDU including the UL data. The resume request message may include an inactive radio network temporary identifier (I-RNTI), and the I-RNTI may include a gNB ID indicating the last serving gNB.

In step S910, the current gNB transmits a LCID for the UL data to the last serving gNB. First, the UL data received from the UE may be de-multiplexed with the resume request message in the current gNB. Then, when the current gNB is able to resolve the gNB ID included in the I-RNTI which indicates the last serving gNB, the current gNB may transmit the LCID for the UL data to the last serving gNB.

The LCID for the UL data may indicate a logical channel used for transmission of the UL data. The LCID for the UL data may be transmitted via a retrieve UE context request message. The retrieve UE context request message may include an establishment cause for EDT, which means data transmission via MSG3 of a random access procedure in RRC_INACTIVE. The establishment cause for EDT may indicate that the UL data for EDT is arrived at the current gNB.

In step S920, the current gNB receives UL forwarding UP TNL information from the last serving gNB. The UL forwarding UP TNL information may be based on mapping between the LCID for the UL data and DRB ID or PDU session ID in a UE context stored in the last serving gNB. The UL forwarding UP TNL information may be received via a retrieve UE context failure message. The retrieve UE context failure message may include a release request message with a suspend configuration to transit the UE to RRC_INACTIVE. The release request message with the suspend configuration may be transmitted to the UE.

In step S930, the current gNB forwards the UL data to a core network via the last serving gNB based on the UL forwarding UP TNL information.

If current gNB includes a gNB-CU and a gNB-DU in CU-DU split, the resume request including the UL data may be received by the gNB-DU from the UE. The LCID for the UL data may be generated by the gNB-DU and transmitted to the gNB-CU and then to the last serving gNB. The UL forwarding UP TNL information may be received by the gNB-CU from the last serving gNB, and then transmitted by the gNB-CU to the gNB-DU.

Figure 10:
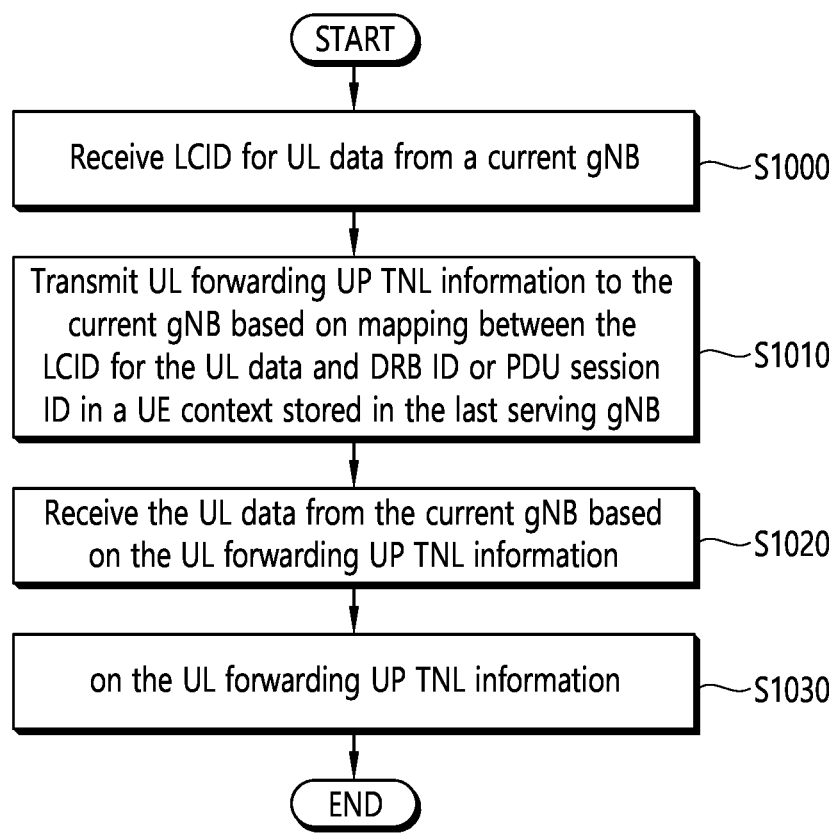
FIG. 10 shows an example of a method for a last serving gNB supporting EDT in RRC_INACTIVE according to the embodiment 1 of the present invention.

FIG. 10 shows an example of a method for a last serving gNB supporting EDT in RRC_INACTIVE according to the embodiment 1 of the present invention.

A current gNB is a gNB on which a UE is currently camped in RRC_INACTIVE, and a last serving gNB is a gNB on which the UE was connected lastly before transiting to RRC_INACTIVE.

In step S1000, the last serving gNB receives a LCID for UL data from the current gNB. The LCID for the UL data may indicate a logical channel used for transmission of the UL data. The LCID for the UL data may be received via a retrieve UE context request message. The retrieve UE context request message may include an establishment cause for EDT, which means data transmission via MSG3 of a random access procedure in RRC_INACTIVE. The establishment cause for EDT may indicate that the UL data for EDT is arrived at the current gNB.

The last serving gNB may receive an I-RNTI with the LCID for the UL data. The last serving gNB may determine whether to find the UE context related to the I-RNTI or not. The last serving gNB may determine not to provide the UE context to the current gNB based on determination that the UE context related the I-RNTI has been found.

In step S1010, the last serving gNB transmits UL forwarding UP TNL information to the current gNB based on mapping between the LCID for the UL data and DRB ID or PDU session ID in a UE context stored in the last serving gNB. The UL forwarding UP TNL information may be transmitted via a retrieve UE context failure message. The retrieve UE context failure message may include a release request message with a suspend configuration to transit the UE to RRC_INACTIVE. The release request message with the suspend configuration may be transmitted to the UE.

In step S1020, the last serving gNB receives the UL data from the current gNB based on the UL forwarding UP TNL information. In step S1030, the last serving gNB forwards the UL data to a core network.

Figure 11:
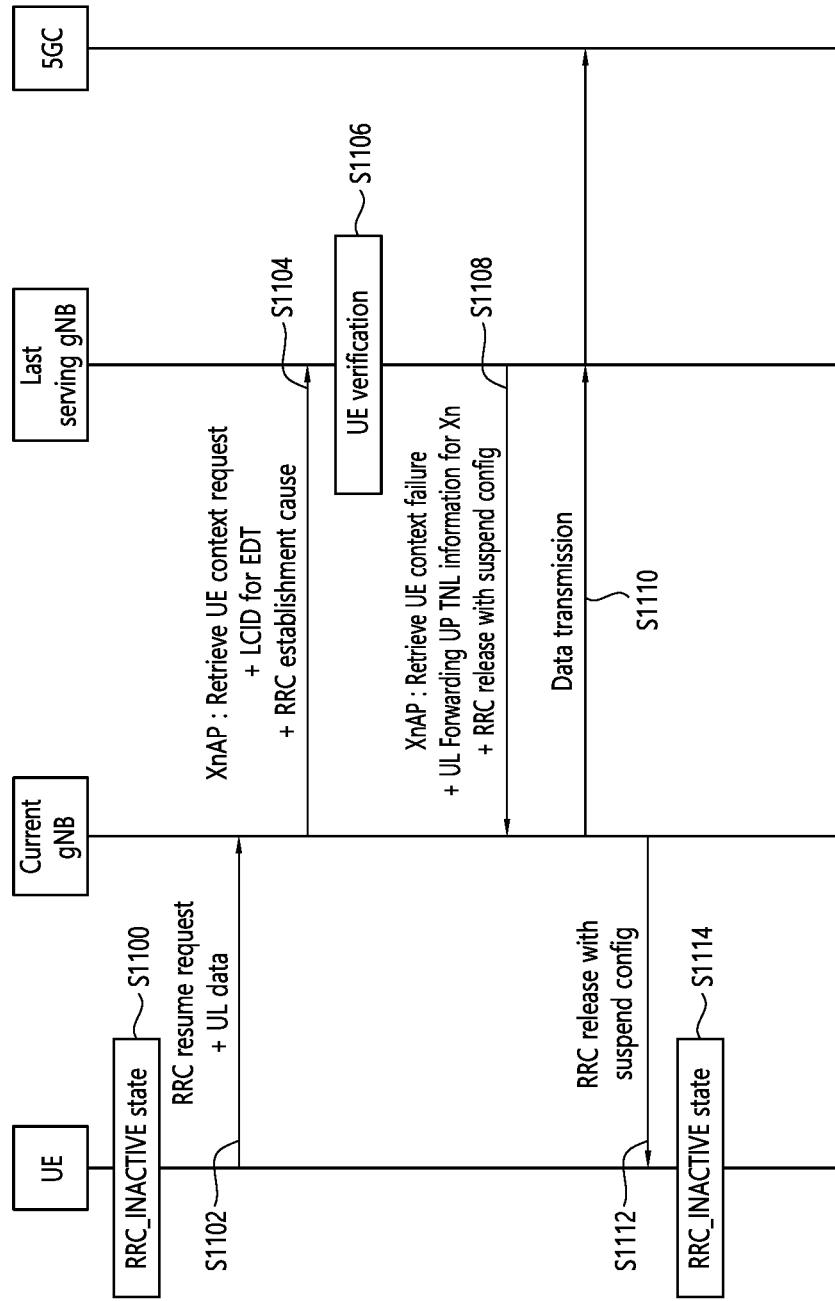
FIG. 11 shows an example of a procedure for successful RRC connection resume with EDT without CU-DU split according to the embodiment 1 of the present invention.

FIG. 11 shows an example of a procedure for successful RRC connection resume with EDT without CU-DU split according to the embodiment 1 of the present invention.

Step S1100: the UE is in RRC_INACTIVE. The UE and last serving gNB-CU store the UE context. The NG-C connection between last serving gNB and AMF is maintained. In addition, the NG-U connection between last serving gNB and UPF is maintained.

Step S1102: Since the UE in RRC_INACTIVE needs to transit to RRC_CONNECTED due to EDT, the UE sends the RRC Resume Request message (or new message) to the current gNB after RACH procedure. The RRC Resume Request message may include UL data. The RRC Resume Request message may be multiplexed by MAC with a DRB PDU that contains the UL data. The RRC Resume Request message may include an I-RNTI which includes a gNB ID. The gNB ID may indicate the last serving gNB, which means that the UE was connected to the last serving gNB lastly before transiting to RRC_INACTIVE, and the last serving gNB keeps the UE context.

Step S1104: Upon receiving the RRC Resume Request message including the UL data, the UL data may be de-multiplexed with the RRC Resume Request message in the current gNB. Then, if the current gNB is able to resolve the gNB ID included in the I-RNTI (i.e. the last serving gNB), the current gNB requests the last serving gNB to provide the UE context by sending the Retrieve UE Context Request message (or new message).

The Retrieve UE Context Request message may include the LCID for the UL data, i.e. LCID for EDT. The LCID for the UL data may indicate a logical channel used for transmission of the UL data. Specifically, if the current gNB receives the UL data via the RRC Resume Request message in EDT and if the current gNB can identify the last serving gNB based on the I-RNTI, the current gNB may transmit the LCID for the UL data to the last serving gNB via the Retrieve UE Context Request message. The Retrieve UE Context Request message may further include an RRC establishment cause for EDT. The RRC establishment cause for EDT may indicate that the UL data for EDT is arrived at the current gNB. The Retrieve UE Context Request message may further include the I-RNTI received from the UE.

Step S1106: Upon receiving the Retrieve UE Context Request message including the I-RNTI from the current gNB, the last serving gNB first checks whether to able to find the UE context related to the I-RNTI or not.

Step S1108: If the last serving gNB is able to find the UE context related to the I-RNTI and decides not to provide the UE context to the current gNB, the last serving gNB responds to the current gNB with the Retrieve UE Context Failure message (or new message).

The LCID for the UL data, i.e. LCID for EDT, can be mapped to DRB ID and/or PDU session ID in the UE context stored in the last serving gNB. The last serving gNB may determine whether the LCID for the UL data is mapped to the DRB ID and/or PDU session ID in the UE context or not. If it is determined that the LCID for the UL data is mapped to the DRB ID and/or PDU session ID in the UE context, the last serving gNB may include UL forwarding UP TNL information in the Retrieve UE Context Failure message for UL data forwarding. The Retrieve UE Context Failure message may further include an RRC Release message with suspend configuration in order to transit the UE back to RRC_INACTIVE.

Step S1110: Upon receiving the Retrieve UE Context Failure message including the UL forwarding UP TNL information from the last serving gNB, the current gNB forwards pending UL data to the 5GC via the last serving gNB based on the received UL forwarding UP TNL information.

Step S1112: The current gNB sends the RRC Release message with suspend configuration to the UE.

Step S1114: The UE is now in RRC_INACTIVE.

Figure 12:
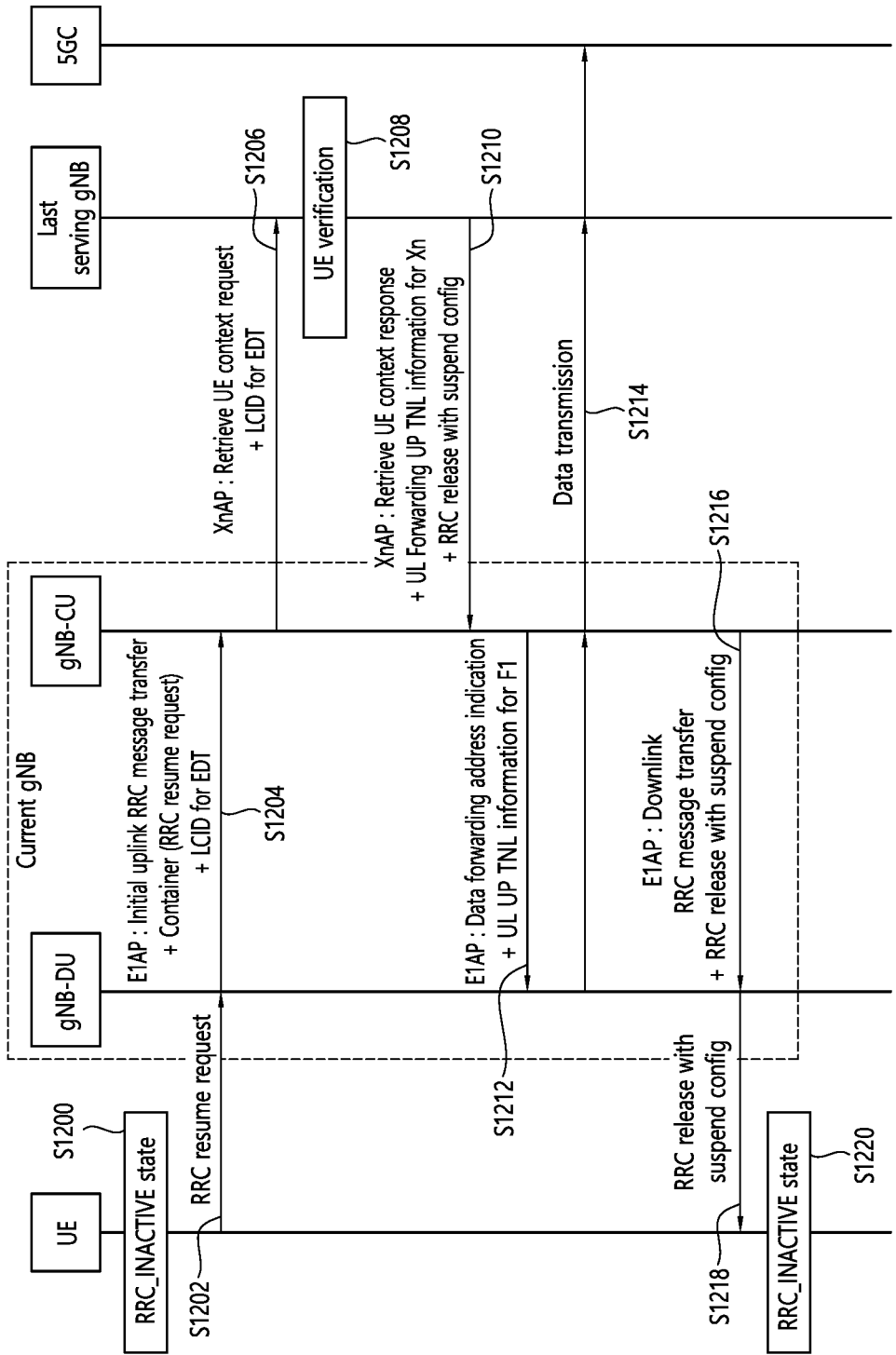
FIG. 12 shows an example of a procedure for successful RRC connection resume with EDT considering CU-DU split according to the embodiment 1 of the present invention.

FIG. 12 shows an example of a procedure for successful RRC connection resume with EDT considering CU-DU split according to the embodiment 1 of the present invention.

Step S1200: the UE is in RRC_INACTIVE. The UE and last serving gNB-CU store the UE context. The NG-C connection between last serving gNB and AMF is maintained. In addition, the NG-U connection between last serving gNB and UPF is maintained.

Step S1202: Since the UE in RRC_INACTIVE needs to transit to RRC_CONNECTED due to EDT, the UE sends the RRC Resume Request message (or new message) to the current gNB after RACH procedure. The RRC Resume Request message may include UL data. The RRC Resume Request message may be multiplexed by MAC with a DRB PDU that contains the UL data. The RRC Resume Request message may include an I-RNTI which includes a gNB ID. The gNB ID may indicate the last serving gNB, which means that the UE was connected to the last serving gNB lastly before transiting to RRC_INACTIVE, and the last serving gNB keeps the UE context.

Step S1204: Upon receiving the RRC Resume Request message including the UL data from the UE, the UL data may be de-multiplexed with the RRC Resume Request message in the current gNB-DU. Then, the current gNB-DU sends the Initial Uplink RRC Message Transfer message (or new message) to the current gNB-CU. The Initial Uplink RRC Message Transfer message may include a container which piggybacks the RRC Resume Request message received from the UE. Also, the Initial Uplink RRC Message Transfer message may further include the LCID for the UL data, i.e. LCID for EDT. The LCID for the UL data may indicate a logical channel used for transmission of the UL data. The current gNB-DU buffers the UL data received from the UE.

Step S1206: Upon receiving the Initial Uplink RRC Message Transfer message including the LCID for the UL data and the RRC Resume Request message (i.e. including the I-RNTI) from the current gNB-DU, if the current gNB-CU is able to resolve the gNB ID included in the I-RNTI (i.e. the last serving gNB), the current gNB-CU requests the last serving gNB to provide the UE context by sending the Retrieve UE Context Request message (or new message).

The Retrieve UE Context Request message may include the LCID for the UL data. Specifically, if the current gNB receives the UL data via the RRC Resume Request message in EDT and if the current gNB can identify the last serving gNB based on the I-RNTI, the current gNB may transmit the LCID for the UL data to the last serving gNB via the Retrieve UE Context Request message. The Retrieve UE Context Request message may further include an RRC establishment cause for EDT. The RRC establishment cause for EDT may indicate that the UL data for EDT is arrived at the current gNB. The Retrieve UE Context Request message may further include the I-RNTI received from the UE.

Step S1208: Upon receiving the Retrieve UE Context Request message including the I-RNTI from the current gNB-CU, the last serving gNB first checks whether to able to find the UE context related to the I-RNTI or not.

Step S1210: If the last serving gNB is able to find the UE context related to the I-RNTI and decides not to provide the UE context to the current gNB, the last serving gNB responds to the current gNB with the Retrieve UE Context Failure message (or new message).

The LCID for the UL data, i.e. LCID for EDT, can be mapped to DRB ID and/or PDU session ID in the UE context stored in the last serving gNB. The last serving gNB may determine whether the LCID for the UL data is mapped to the DRB ID and/or PDU session ID in the UE context or not. If it is determined that the LCID for the UL data is mapped to the DRB ID and/or PDU session ID in the UE context, the last serving gNB may include UL forwarding UP TNL information in the Retrieve UE Context Failure message for UL data forwarding. The Retrieve UE Context Failure message may further include an RRC Release message with suspend configuration in order to transit the UE back to RRC_INACTIVE.

Step S1212: Upon receiving the Retrieve UE Context Failure message including the UL forwarding UP TNL information from the last serving gNB, the current gNB-CU sends the Data Forwarding Address Indication message (or new message) to the current gNB-DU. The Data Forwarding Address Indication message may include the UL forwarding UP TNL information to forward the UL data buffered at the current gNB-DU. The UL forwarding UP TNL information may be included in the Downlink RRC Message Transfer message which will be described in step S1216 below.

In step S1214: Upon receiving the Data Forwarding Address Indication message including the UL forwarding UP TNL information from the current gNB-CU, the current gNB-DU forwards pending UL data to the 5GC via the current gNB-CU and the last serving gNB based on the received UL forwarding UP TNL information. If the UL forwarding UP TNL information is included in the Downlink RRC Message Transfer message which will be described in step S1216 below, the data forwarding may be performed after step S1216.

Step S1216: The current gNB-CU sends the Downlink RRC Message Transfer message (or new message) to the current gNB-DU. The Downlink RRC Message Transfer message may include a container which piggybacks the RRC Release message with suspend configuration in order to transit the UE back to RRC_INACTIVE.

Step S1218: The current gNB-DU sends the RRC Release message with suspend configuration to the UE.

Step S1220: The UE is now in RRC_INACTIVE.

According to the embodiment 1 of the present invention shown in FIG. 9 to FIG. 12, the last serving gNB can quickly allocate UL forwarding UP TNL information to the current gNB for EDT. In case of CU-DU split, the current gNB-CU can quickly allocate UL forwarding UP TNL information to the current gNB-DU. Therefore, UE's experience can be enhanced since latency for UL data transmission can be reduced. In addition, unnecessary state transition can be avoided since the UE does not need to transit to RRC_CONNECTED to transmit the UL data.

2. Embodiment 2

According to the embodiment 2 of the present invention, when Xn interface and/or or F1 interface is set up, two nodes performing Xn setup procedure and/or F1 setup procedure may exchange UL forwarding UP TNL information for EDT. Based on the exchanged UL forwarding UP TNL information for EDT, the gNB(-DU) can quickly sends UL data to the target node via the Xn interface and/or F1 interface when the EDT is triggered at the UE.

Figure 13:
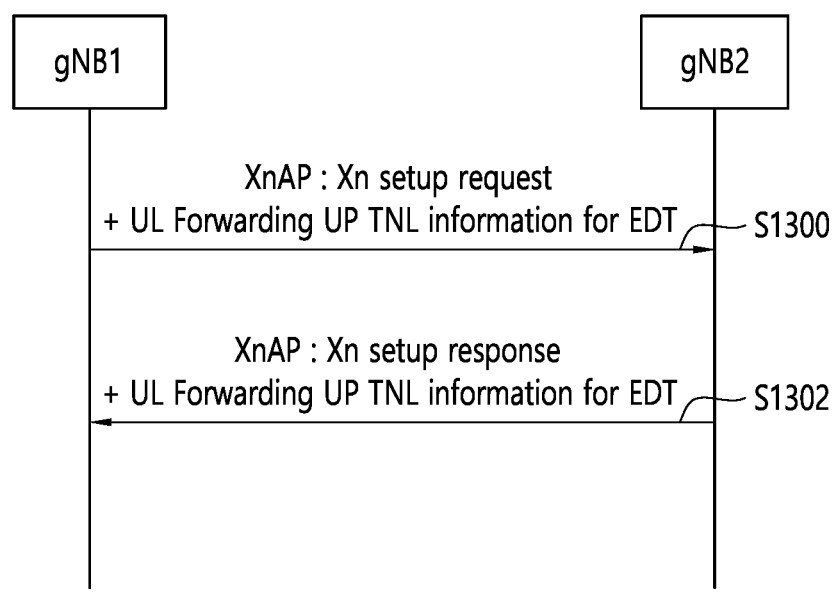
FIG. 13 shows an example of Xn setup procedure considering EDT according to the embodiment 2 of the present invention.

FIG. 13 shows an example of Xn setup procedure considering EDT according to the embodiment 2 of the present invention.

In step S1300, the gNB1 initiates the Xn setup procedure by sending the Xn Setup Request message including appropriate data to the gNB2. The Xn Setup Request message may contain the UL Forwarding UP TNL Information for EDT information element (IE). The UL Forwarding UP TNL Information for EDT IE may indicate information related to fast data forwarding in the gNB2.

In step S1302, the gNB2 responds with the Xn Setup Response message including appropriate data to the gNB1. The Xn Setup Response message may contain the UL Forwarding UP TNL Information for EDT IE. The UL Forwarding UP TNL Information for EDT IE may indicate information related to fast data forwarding in the gNB1.

Figure 14:
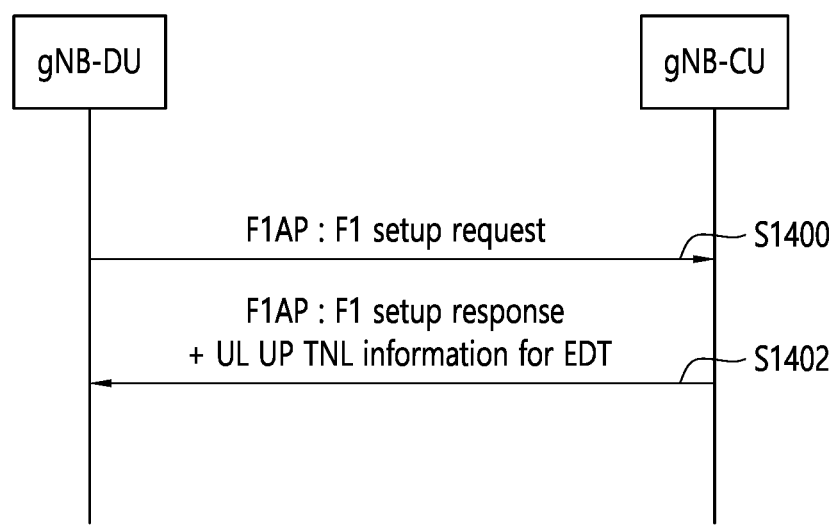
FIG. 14 shows an example of F1 setup procedure considering EDT according to the embodiment 2 of the present invention.

FIG. 14 shows an example of F1 setup procedure considering EDT according to the embodiment 2 of the present invention.

In step S1400, the gNB-DU initiates the F1 setup procedure by sending the F1 Setup Request message including appropriate data to the gNB-CU.

In step S1402, the gNB-CU responds with the F1 Setup Response message including appropriate data to the gNB-DU. The F1 Setup Response message may contain the UL Forwarding UP TNL Information for EDT IE. The UL Forwarding UP TNL Information for EDT IE may indicate information related to fast data forwarding in the gNB-DU.

Figure 15:
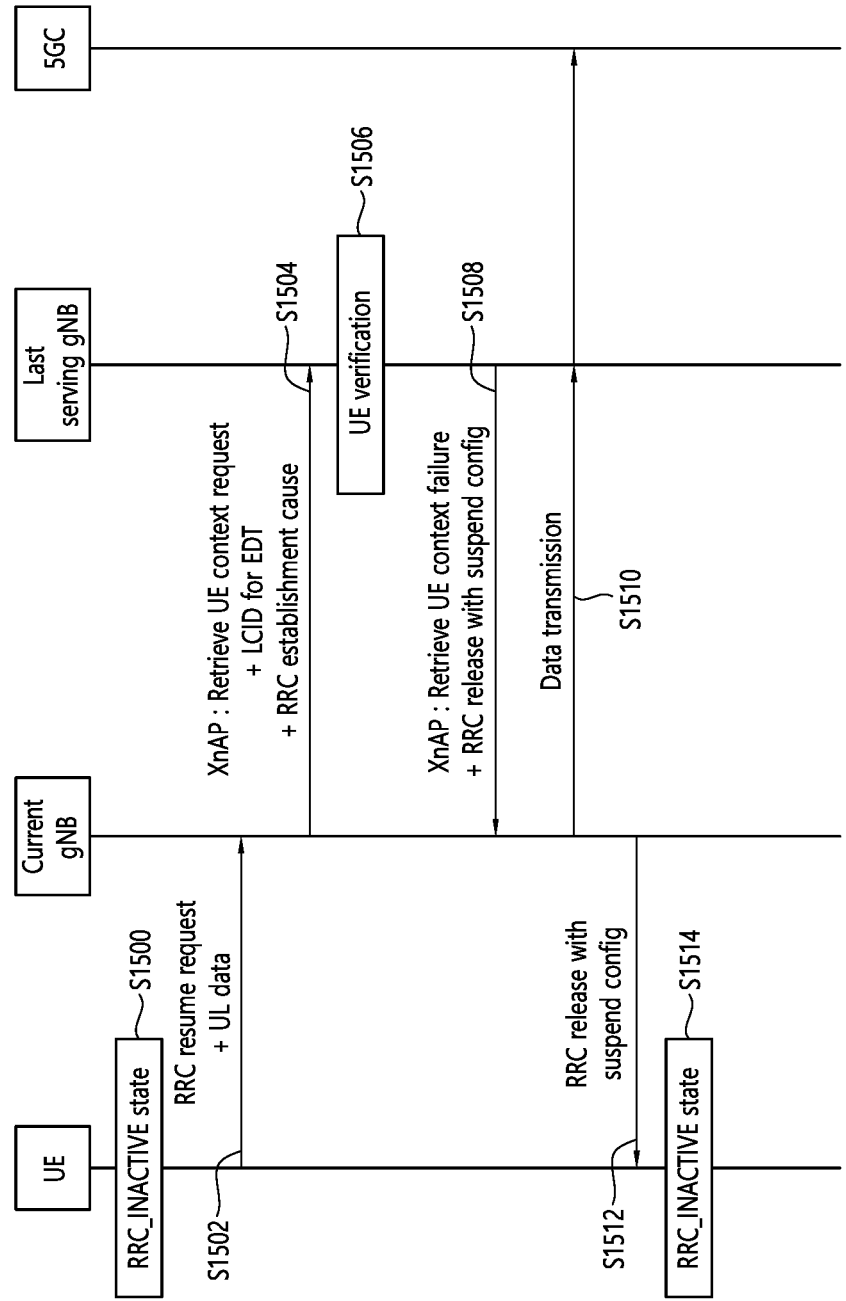
FIG. 15 shows an example of a procedure for successful RRC connection resume with EDT without CU-DU split according to the embodiment 2 of the present invention.

FIG. 15 shows an example of a procedure for successful RRC connection resume with EDT without CU-DU split according to the embodiment 2 of the present invention.

Step S1500: the UE is in RRC_INACTIVE. The UE and last serving gNB-CU store the UE context. The NG-C connection between last serving gNB and AMF is maintained. In addition, the NG-U connection between last serving gNB and UPF is maintained.

Step S1502: Since the UE in RRC_INACTIVE needs to transit to RRC_CONNECTED due to EDT, the UE sends the RRC Resume Request message (or new message) to the current gNB after RACH procedure. The RRC Resume Request message may include UL data. The RRC Resume Request message may be multiplexed by MAC with a DRB PDU that contains the UL data. The RRC Resume Request message may include an I-RNTI which includes a gNB ID. The gNB ID may indicate the last serving gNB, which means that the UE was connected to the last serving gNB lastly before transiting to RRC_INACTIVE, and the last serving gNB keeps the UE context.

Step S1504: Upon receiving the RRC Resume Request message including the UL data, the UL data may be demultiplexed with the RRC Resume Request message in the current gNB. Then, if the current gNB is able to resolve the gNB ID included in the I-RNTI (i.e. the last serving gNB), the current gNB requests the last serving gNB to provide the UE context by sending the Retrieve UE Context Request message (or new message).

The Retrieve UE Context Request message may include the LCID for the UL data, i.e. LCID for EDT. The LCID for the UL data may indicate a logical channel used for transmission of the UL data. Specifically, if the current gNB receives the UL data via the RRC Resume Request message in EDT and if the current gNB can identify the last serving gNB based on the I-RNTI, the current gNB may transmit the LCID for the UL data to the last serving gNB via the Retrieve UE Context Request message. The Retrieve UE Context Request message may further include an RRC establishment cause for EDT. The RRC establishment cause for EDT may indicate that the UL data for EDT is arrived at the current gNB. The Retrieve UE Context Request message may further include the I-RNTI received from the UE.

Step S1506: Upon receiving the Retrieve UE Context Request message including the I-RNTI from the current gNB, the last serving gNB first checks whether to able to find the UE context related to the I-RNTI or not.

Step S1508: If the last serving gNB is able to find the UE context related to the I-RNTI and decides not to provide the UE context to the current gNB, the last serving gNB responds to the current gNB with the Retrieve UE Context Failure message (or new message). The Retrieve UE Context Failure message may include an RRC Release message with suspend configuration in order to transit the UE back to RRC_INACTIVE.

Step S1510: Upon receiving the Retrieve UE Context Failure message from the last serving gNB, the current gNB forwards pending UL data to the 5GC via the last serving gNB. The information related to data forwarding has been already exchanged between the current gNB and the last serving gNB during the Xn Setup procedure, as shown in FIG. 13 above.

Step S1512: The current gNB sends the RRC Release message with suspend configuration to the UE.

Step S1514: The UE is now in RRC_INACTIVE.

Figure 16:
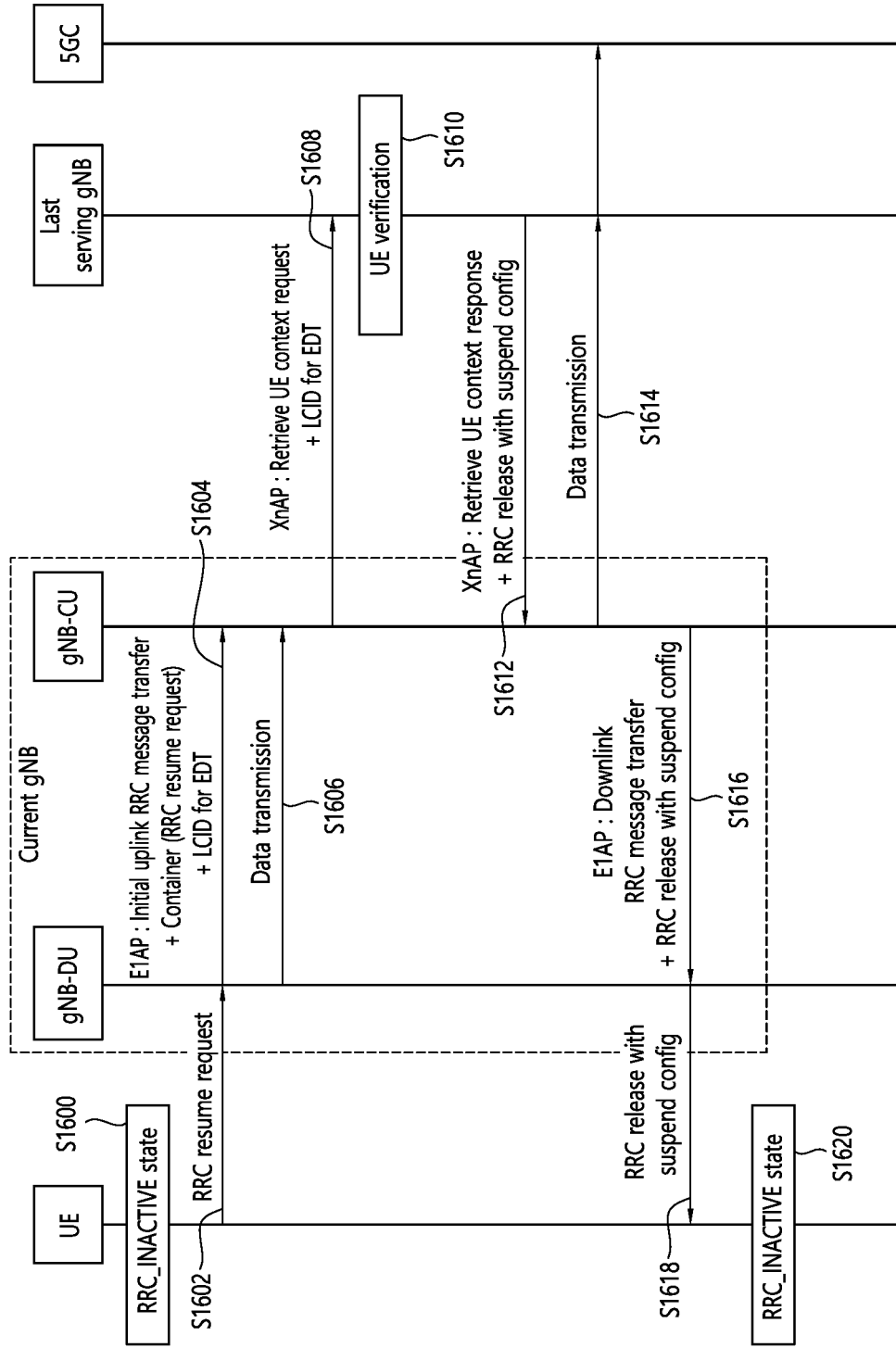
FIG. 16 shows an example of a procedure for successful RRC connection resume with EDT considering CU-DU split according to the embodiment 2 of the present invention.

FIG. 16 shows an example of a procedure for successful RRC connection resume with EDT considering CU-DU split according to the embodiment 2 of the present invention.

Step S1600: the UE is in RRC_INACTIVE. The UE and last serving gNB-CU store the UE context. The NG-C connection between last serving gNB and AMF is maintained. In addition, the NG-U connection between last serving gNB and UPF is maintained.

Step S1602: Since the UE in RRC_INACTIVE needs to transit to RRC_CONNECTED due to EDT, the UE sends the RRC Resume Request message (or new message) to the current gNB after RACH procedure. The RRC Resume Request message may include UL data. The RRC Resume Request message may be multiplexed by MAC with a DRB PDU that contains the UL data. The RRC Resume Request message may include an I-RNTI which includes a gNB ID. The gNB ID may indicate the last serving gNB, which means that the UE was connected to the last serving gNB lastly before transiting to RRC_INACTIVE, and the last serving gNB keeps the UE context.

Step S1604: Upon receiving the RRC Resume Request message including the UL data from the UE, the UL data may be de-multiplexed with the RRC Resume Request message in the current gNB-DU. Then, the current gNB-DU sends the Initial Uplink RRC Message Transfer message (or new message) to the current gNB-CU. The Initial Uplink RRC Message Transfer message may include a container which piggybacks the RRC Resume Request message received from the UE. Also, the Initial Uplink RRC Message Transfer message may further include the LCID for the UL data, i.e. LCID for EDT. The LCID for the UL data may indicate a logical channel used for transmission of the UL data. The current gNB-DU buffers the UL data received from the UE.

Step S1606: The current gNB-DU forwards the UL data to the current gNB-CU. The information related to data forwarding has been already exchanged between the current gNB-DU and the current gNB-CU during the F1 Setup procedure, as shown in FIG. 14 above.

Step S1608: Upon receiving the Initial Uplink RRC Message Transfer message including the LCID for the UL data and the RRC Resume Request message (i.e. including the I-RNTI) from the current gNB-DU, if the current gNB-CU is able to resolve the gNB ID included in the I-RNTI (i.e. the last serving gNB), the current gNB-CU requests the last serving gNB to provide the UE context by sending the Retrieve UE Context Request message (or new message).

The Retrieve UE Context Request message may include the LCID for the UL data. Specifically, if the current gNB receives the UL data via the RRC Resume Request message in EDT and if the current gNB can identify the last serving gNB based on the I-RNTI, the current gNB may transmit the LCID for the UL data to the last serving gNB via the Retrieve UE Context Request message. The Retrieve UE Context Request message may further include an RRC establishment cause for EDT. The RRC establishment cause for EDT may indicate that the UL data for EDT is arrived at the current gNB. The Retrieve UE Context Request message may further include the I-RNTI received from the UE.

Step S1610: Upon receiving the Retrieve UE Context Request message including the I-RNTI from the current gNB-CU, the last serving gNB first checks whether to able to find the UE context related to the I-RNTI or not.

Step S1612: If the last serving gNB is able to find the UE context related to the I-RNTI and decides not to provide the UE context to the current gNB, the last serving gNB responds to the current gNB with the Retrieve UE Context Failure message (or new message). The Retrieve UE Context Failure message may include an RRC Release message with suspend configuration in order to transit the UE back to RRC_INACTIVE.

Step S1614: Upon receiving the Retrieve UE Context Failure message from the last serving gNB, the current gNB-CU forwards pending UL data to the 5GC via the last serving gNB. The information related to data forwarding has been already exchanged between the current gNB and the last serving gNB during the Xn Setup procedure, as shown in FIG. 13 above.

Step S1616: The current gNB-CU sends the Downlink RRC Message Transfer message (or new message) to the current gNB-DU. The Downlink RRC Message Transfer message may include a container which piggybacks the RRC Release message with suspend configuration in order to transit the UE back to RRC_INACTIVE.

Step S1618: The current gNB-DU sends the RRC Release message with suspend configuration to the UE.

Step S1620: The UE is now in RRC_INACTIVE.

According to the embodiment 2 of the present invention shown in FIG. 13 to FIG. 16, UL forwarding UP TNL information for EDT can be pre-allocated at the gNB-CU or last serving gNB during interface setup procedure. Therefore, UE's experience can be enhanced since latency for UL data transmission can be reduced. In addition, unnecessary state transition can be avoided since the UE does not need to transit to RRC_CONNECTED to transmit the UL data.

The present invention may be applied to case of CU-DU split in LTE for resuming the UE context in the narrowband IoT (NB-IoT) UE and the lightly connected UE.

The present invention may be applied to various future technologies, such as AI.

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 17:
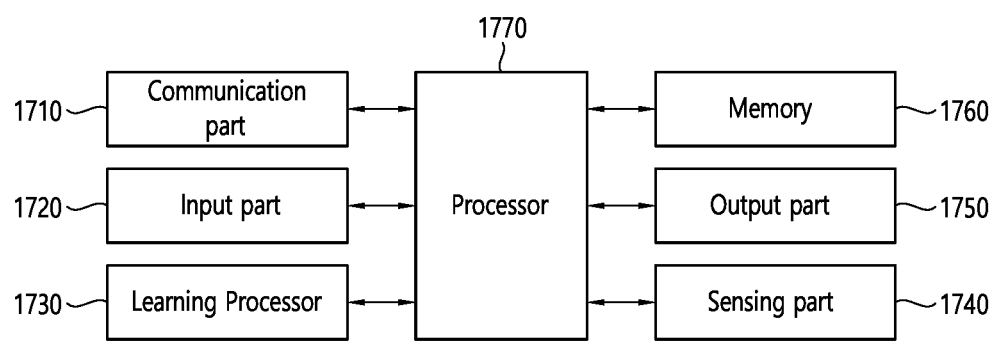
FIG. 17 shows an example of an AI device to which the technical features of the present invention can be applied.

FIG. 17 shows an example of an AI device to which the technical features of the present invention can be applied.

The AI device 1700 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 17, the AI device 1700 may include a communication part 1710, an input part 1720, a learning processor 1730, a sensing part 1740, an output part 1750, a memory 1760, and a processor 1770.

The communication part 1710 can transmit and/or receive data to and/or from external devices such as the AI devices and the A server using wire and/or wireless communication technology. For example, the communication part 1710 can transmit and/or receive sensor information, a user input, a learning model, and a control signal with external devices. The communication technology used by the communication part 1710 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1720 can acquire various kinds of data. The input part 1720 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1720 can acquire input data to be used when acquiring an output using learning data and a learning model for model learning. The input part 1720 may obtain raw input data, in which case the processor 1770 or the learning processor 1730 may extract input features by preprocessing the input data.

The learning processor 1730 may learn a model composed of an ANN using learning data. The learned ANN can be referred to as a learning model. The learning model can be used to infer result values for new input data rather than learning data, and the inferred values can be used as a basis for determining which actions to perform. The learning processor 1730 may perform AI processing together with the learning processor of the AI server. The learning processor 1730 may include a memory integrated and/or implemented in the AI device 1700. Alternatively, the learning processor 1730 may be implemented using the memory 1760, an external memory directly coupled to the AI device 1700, and/or a memory maintained in an external device.

The sensing part 1740 may acquire at least one of internal information of the AI device 1700, environment information of the AI device 1700, and/or the user information using various sensors. The sensors included in the sensing part 1740 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1750 may generate an output related to visual, auditory, tactile, etc. The output part 1750 may include a display unit for outputting visual information, a speaker for outputting auditory information, and/or a haptic module for outputting tactile information.

The memory 1760 may store data that supports various functions of the AI device 1700. For example, the memory 1760 may store input data acquired by the input part 1720, learning data, a learning model, a learning history, etc.

The processor 1770 may determine at least one executable operation of the AI device 1700 based on information determined and/or generated using a data analysis algorithm and/or a machine learning algorithm. The processor 1770 may then control the components of the AI device 1700 to perform the determined operation. The processor 1770 may request, retrieve, receive, and/or utilize data in the learning processor 1730 and/or the memory 1760, and may control the components of the AI device 1700 to execute the predicted operation and/or the operation determined to be desirable among the at least one executable operation. The processor 1770 may generate a control signal for controlling the external device, and may transmit the generated control signal to the external device, when the external device needs to be linked to perform the determined operation. The processor 1770 may obtain the intention information for the user input and determine the user's requirements based on the obtained intention information. The processor 1770 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1730 and/or learned by the learning processor of the AI server, and/or learned by their distributed processing. The processor 1770 may collect history information including the operation contents of the AI device 1700 and/or the user's feedback on the operation, etc. The processor 1770 may store the collected history information in the memory 1760 and/or the learning processor 1730, and/or transmit to an external device such as the A server. The collected history information can be used to update the learning model. The processor 1770 may control at least some of the components of AI device 1700 to drive an application program stored in memory 1760. Furthermore, the processor 1770 may operate two or more of the components included in the AI device 1700 in combination with each other for driving the application program.

Figure 18:
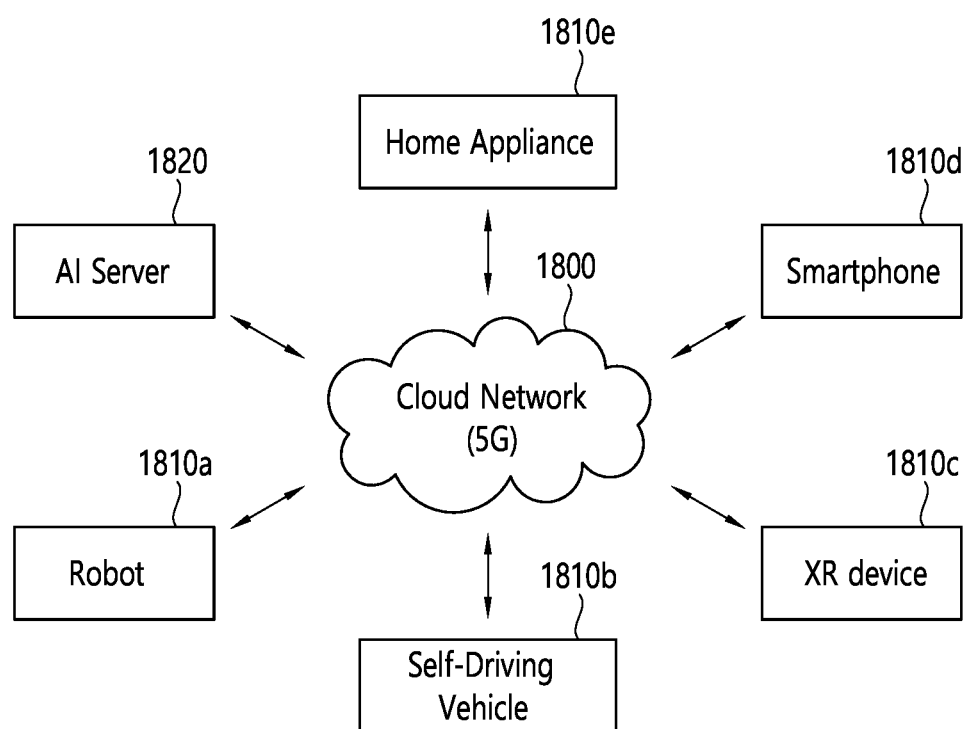
FIG. 18 shows an example of an AI system to which the technical features of the present invention can be applied.

FIG. 18 shows an example of an AI system to which the technical features of the present invention can be applied.

Referring to FIG. 18, in the AI system, at least one of an AI server 1820, a robot 1810*a*, an autonomous vehicle 1810*b*, an XR device 1810*c*, a smartphone 1810*d* and/or a home appliance 1810*e* is connected to a cloud network 1800. The robot 1810*a*, the autonomous vehicle 1810*b*, the XR device 1810*c*, the smartphone 1810*d*, and/or the home appliance 1810*e* to which the AI technology is applied may be referred to as AI devices 1810*a* to 1810*e*.

The cloud network 1800 may refer to a network that forms part of a cloud computing infrastructure and/or resides in a cloud computing infrastructure. The cloud network 1800 may be configured using a 3G network, a 4G or LTE network, and/or a 5G network. That is, each of the devices 1810*a* to 1810*e* and 1820 consisting the AI system may be connected to each other through the cloud network 1800. In particular, each of the devices 1810*a* to 1810*e* and 1820 may communicate with each other through a base station, but may directly communicate with each other without using a base station.

The AI server 1800 may include a server for performing AI processing and a server for performing operations on big data. The AI server 1800 is connected to at least one or more of AI devices constituting the AI system, i.e. the robot 1810*a*, the autonomous vehicle 1810*b*, the XR device 1810*c*, the smartphone 1810*d* and/or the home appliance 1810*e* through the cloud network 1800, and may assist at least some AI processing of the connected AI devices 1810*a* to 1810*e*. The AI server 1800 can learn the ANN according to the machine learning algorithm on behalf of the AI devices 1810*a* to 1810*e*, and can directly store the learning models and/or transmit them to the AI devices 1810*a* to 1810*e*. The AI server 1800 may receive the input data from the AI devices 1810*a* to 1810*e*, infer the result value with respect to the received input data using the learning model, generate a response and/or a control command based on the inferred result value, and transmit the generated data to the AI devices 1810*a* to 1810*e*. Alternatively, the AI devices 1810*a* to 1810*e* may directly infer a result value for the input data using a learning model, and generate a response and/or a control command based on the inferred result value.

Various embodiments of the AI devices 1810*a* to 1810*e* to which the technical features of the present invention can be applied will be described. The A devices 1810*a* to 1810*e* shown in FIG. 18 can be seen as specific embodiments of the AI device 1700 shown in FIG. 17.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method performed by a current gNB in a wireless communication system, the method comprising:
    based on i) a user equipment (UE) being in an inactive state, and ii) a transmission of uplink (UL) data being allowed while the UE is remaining in the inactive state, receiving, from the UE, a resume request message with the UL data;
    identifying a last serving gNB based an inactive radio network temporary identity (I-RNTI);
    transmitting, to the last serving gNB, a retrieve UE context request message,
    wherein the retrieve UE context request message includes information related to the transmission of the UL data in the inactive state;
    receiving, from the last serving gNB, a response message in response to the retrieve UE context request message,
    wherein the response message includes UL forwarding user plane (UP) transport network layer (TNL) information;
    transmitting, to a user plane function (UPF), the UL data based on the UL forwarding UP TNL information; and
    after the transmission of the UL data is completed, transmitting, to the UE, a release message including a suspend indication, upon which the UE is back to the inactive state.

2. The method of claim 1, wherein the information related to the transmission of the UL data includes a logical channel identifier (LCID) indicating a logical channel used for the transmission of the UL data.

3. The method of claim 1, wherein the retrieve UE context request message includes an establishment cause for the transmission of the UL data in the inactive state.

4. The method of claim 1,
    wherein the resume request message is multiplexed with a data radio bearer (DRB) protocol data unit (PDU) including the UL data, and
    wherein the UL data is de-multiplexed with the resume request message in the current gNB.

5. The method of claim 1,
wherein the I-RNTI includes a gNB ID indicating the last serving gNB.

6. The method for claim 1, wherein the UL forwarding UP TNL information is based on mapping between the LCID information related to the transmission of the UL data and a DRB ID or a PDU session ID in a UE context stored in the last serving gNB.

7. The method of claim 1, wherein the response message is a retrieve UE context failure message.

8. The method of claim 1,
wherein the current gNB includes a gNB central unit (gNB-CU) and a gNB distributed unit (gNB-DU),
wherein the information related to the transmission of the UL data is generated by the gNB-DU and transmitted to the gNB-CU,
wherein the information related to the transmission of the UL data is transmitted by the gNB-CU to the last serving gNB,
wherein the UL forwarding UP TNL information is received by the gNB-CU from the last serving gNB, and
wherein the UL forwarding UP TNL information transmitted by the gNB-CU to the gNB-DU.

9. The method of claim 1, wherein the wireless device is in communication with at least one of a user equipment, a network, and/or autonomous vehicles other than the wireless device.

10. A current gNB operating in a wireless communication system, the current gNB comprising:
at least one transceiver;
at least one processor; and
at least one memory operably connectable to the at least one processor and storing instructions that, based on being executed by the at least one processor, perform operations comprising:
based on i) a user equipment (UE) being in an inactive state, and ii) a transmission of uplink (UL) data being allowed while the UE is remaining in the inactive state, receiving, from the UE via the at least one transceiver, a resume request message with the UL data;
identifying a last serving gNB based an inactive radio network temporary identity (I-RNTI);
transmitting, to the last serving gNB via the at least one transceiver, a retrieve UE context request message,
wherein the retrieve UE context request message includes information related to the transmission of the UL data in the inactive state;
receiving, from the last serving gNB via the at least one transceiver, a response message in response to the retrieve UE context request message,
wherein the response message includes UL forwarding user plane (UP) transport network layer (TNL) information;
transmitting, to a user plane function (UPF) via the at least one transceiver, the UL data based on the UL forwarding UP TNL information; and
after the transmission of the UL data is completed, transmitting, to the UE via the at least one transceiver, a release message including a suspend indication, upon which the UE is back to the inactive state.

* * * * *